J. P. LAVIGNE.
VALVE.
APPLICATION FILED MAR. 23, 1908.
929,606.
Patented July 27, 1909.
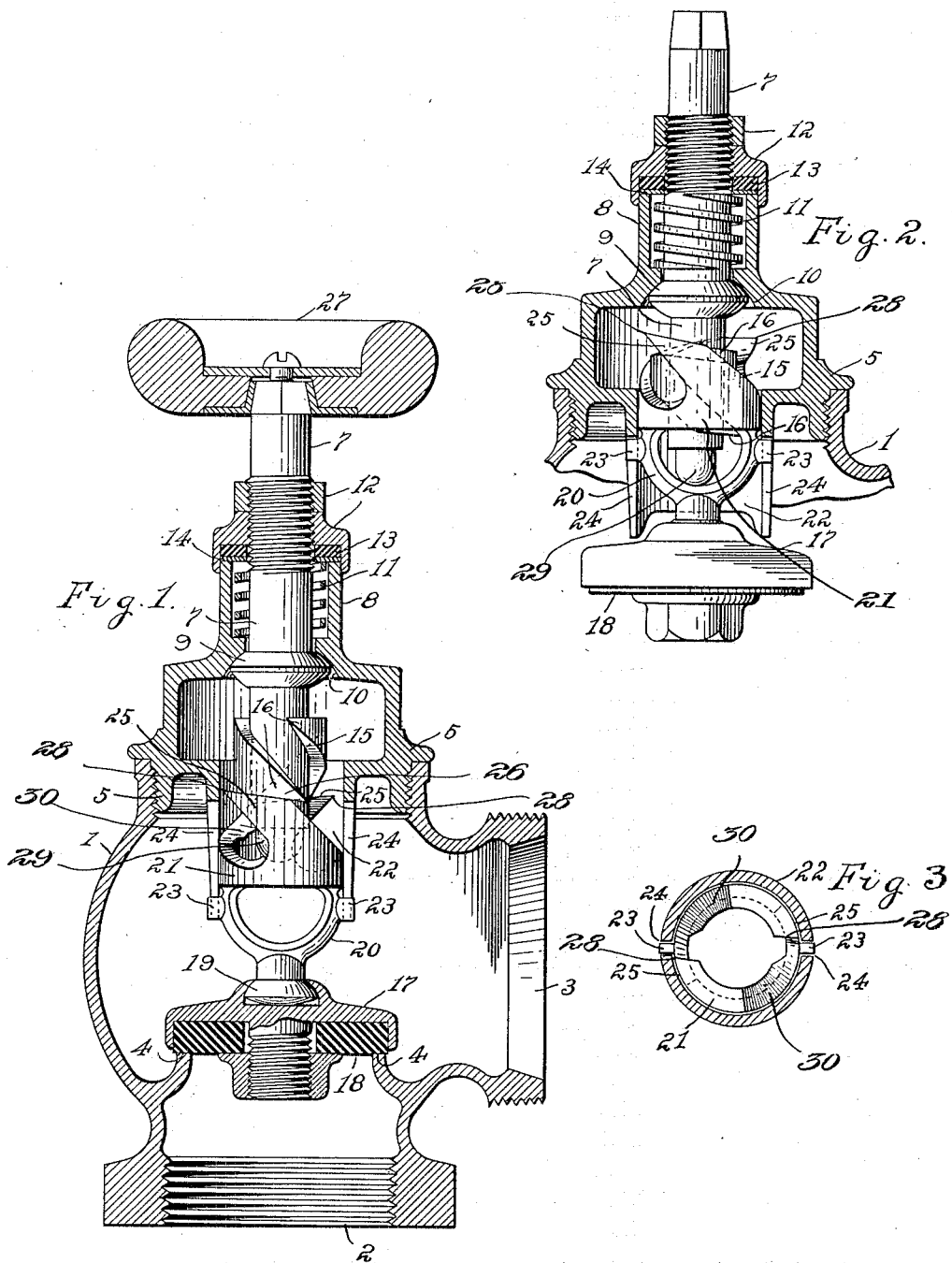
WITNESSES:
Walter A. Greenburg
A. M. Dorr.
INVENTOR
JOSEPH P. LAVIGNE
BY
ATTORNEYS

UNITED STATES PATENT OFFICE.

JOSEPH P. LAVIGNE, OF DETROIT, MICHIGAN.

VALVE.

No. 929,606.  Specification of Letters Patent.  Patented July 27, 1909.

Application filed March 23, 1908. Serial No. 422,851.

*To all whom it may concern:*

Be it known that I, JOSEPH P. LAVIGNE, a citizen of the United States of America, residing at Detroit, in the county of Wayne and State of Michigan, have invented certain new and useful Improvements in Valves, of which the following is a specification, reference being had therein to the accompanying drawings.

This invention relates to valves for radiators and similar uses, and more especially to those of the standard disk closure or so-called "Jenkins disk" type, and to means whereby they may be rapidly opened, and whereby use of packing around the valve stem is avoided.

The invention consists in the matters hereinafter set forth, and more particularly pointed out in the appended claims.

In the drawings, Figure 1 is a view in longitudinal section of a closed valve embodying features of the invention. Fig. 2 is a view in detail of a valve stem, a closing disk and housing, with the disk in raised or open position. Fig. 3 is a view in detail of a disk nut, with the adjacent part of the housing.

Referring to the drawings, 1 indicates a casing of the usual exterior contour, having a steam inlet 2 interiorly screw-threaded for a pipe connection and a side outlet or discharge 3 exteriorly fitted for a pipe coupling all of standard type.

An annular valve seat 4 is formed on the casing interior in axial alinement with the inlet. A bonnet 5 is detachably secured as by screw-threads 6 in the casing opposite to and in axial alinement with the valve seat. A valve stem 7 is rotatably secured in a hollow axial boss 8 on the bonnet. A collar 9 on the stem is ground to seat on a flange 10 in the bonnet and held thereon by a spring 11 in compression between the flange and jam-nuts 12 in the stem.

The inner jam-nut is counterbored to telescope over the boss 8, and an elastic washer 13 is seated therein and yieldingly projects a hard or metal washer 14 against the end of the spring 11 and the boss, thereby insuring against possibility of leak.

Near its lower end, the stem 7 is provided with projecting portions or lugs 16 forming between them wide spiral or cam grooves 15 of quick pitch and the lower ends of these lugs are beveled or inclined to form cam faces. The stem extends downward a short distance beyond these lugs and its end 29 is rounded to form a stop to engage the yoke 20 when the valve disk is lifted, as will be hereinafter more fully described.

A closure 17 of the standard "Jenkins disk" type with "vulcanized" rubber face 18 or the like, adapted to seal the valve seat 4, has a universal joint connection 19 with a yoke 20 which is integrally formed on the end of a tubular cam member 21. This member is movable in a depending sleeve 22 on the bonnet 5 and ears 23 on the yoke engage slots 24 in the sleeve preventing rotation of said member and permit it to move longitudinally of the sleeve. Said member is tubular in form, being of greater internal diameter than the external diameter of the lugs 16 so that it will slide over said lugs and it is cut away from its upper edge downward, forming upwardly extending spirally formed or inclined fingers 25 corresponding to the grooves 15 which are adapted to be engaged by an inwardly projecting ledge or thickened portion 30 on each finger when the stem is turned. The upper ends of the fingers 25 are formed with a bevel or incline similar to the lower ends of the projecting lugs 16 on the stem and this upper inclined surface of each finger meets at its high end the surface forming the edge of the finger at an acute angle forming an upwardly projecting point 26 and the low end of each inclined lower surface of each lug 16 meets the surface forming the edge of the adjacent groove at a similar acute angle and forms a downwardly projecting point 28.

When the parts are in the position shown in Fig. 1 and the stem is turned to the left by means of the hand wheel 27 on its upper end, the lower inclined surfaces of the lugs 16 will move away from the inclined surfaces of the upper ends of the fingers 25, relieving the pressure which forced the disk 17 to seat and permitting said disk and cam member to rise. Further turning in the same direction will engage the points 26 beneath the points 28 of the thickened upper ends 30 of the arms and the cam member and disk will be quickly raised by the engagement of the fingers with the grooves owing to the pitch of said grooves and fingers.

A reverse movement of the stem quickly lowers the disk until the fingers are disengaged from the grooves, at which time the disk engages its seat, and further turning brings the lower surface of the lugs into contact with the upper surface of the thickened portion of the fingers and by reason of the inclination of said surfaces, the cam member is forced downward, slowly forcing the disk to its seat and securely locking the same against any possibility of leakage.

When the cam member 21 is raised as described until the lugs 23 are at the upper ends of the slots 24, the rounded lower end 29 of the valve stem will engage the center of the yoke 20 as shown in Fig. 2 thus forming a stop for the stem and preventing its further turning in that direction which would, if no stop was provided, tend to draw the stem downward, compressing the packing 13 and move the collar 9 from its seat.

Various changes in the details of construction may be made without departing from the spirit of the invention and I do not limit myself to any particular form or arrangement of parts.

What I claim as my invention is:—

1. The combination with a valve casing having a valve seat and a valve member to engage said seat, of a cam member to operate the valve member and an operating stem, said cam member and stem being formed with spirally arranged interlocking surfaces having a quick pitch and inclined surfaces arranged to coöperate to gradually force the disk to its seat after the disengagement of the interlocking surfaces.

2. The combination with a valve casing having a valve seat and a valve member to engage said seat, of a valve stem formed with spiral grooves, a tubular member to operate the valve member and upwardly and spirally extending fingers on said member to engage said grooves.

3. The combination with a valve casing having a valve seat and a valve member to engage said seat, of a valve stem, lugs on said stem forming spiral grooves and each formed with a downwardly projecting point at one side of each groove, a member connected to said valve member, and upwardly and spirally extending portions on said member to engage said grooves and each formed with an upwardly extending point at one side to interlock with said downwardly extending points on the lugs when the stem is turned in one direction to lead said portions into said grooves.

4. The combination with a valve casing having a valve seat and a valve disk to engage said seat, of a valve stem, lugs on said stem formed with spirally extending quick pitch grooves and each formed with an inclined surface at its lower end, a tubular member to which the disk is connected, and upwardly and spirally extending fingers on said tubular member adapted to engage said grooves and each formed with an inclined upper end to engage the inclined lower end of the lugs.

5. The combination with a valve casing having a valve seat and a valve disk to engage said seat, of a valve stem, lugs on said stem formed with spirally extending grooves, a tubular member, means on said member to engage said grooves, a yoke connecting said member and valve disk, and an end on said valve stem adapted to extend downward through the tubular member and engage said yoke when the disk is fully raised.

6. The combination with a valve casing having a valve seat and a valve disk to engage said seat, of a valve stem extending outward through the casing, a collar on said stem to engage a seat on the casing, yielding means to hold the stem with the collar in contact with its seat, lugs on the stem at a distance from its lower end and forming spiral grooves, a tubular member of greater internal diameter than the external diameter of said lugs and formed with inwardly projecting spirally extending portions to engage said grooves, a yoke connecting said tubular member and said valve disk and adapted to be engaged by the lower end of said stem when the disk is fully raised, and means for guiding and limiting the upward movement of said yoke.

7. The combination with a valve casing having a valve seat and a valve disk to engage said seat, of a bonnet secured in the open upper end of said casing opposite the seat, a tubular inwardly extending portion on the bonnet formed with guide slots, a tubular outwardly extending boss on the bonnet, a valve stem extending outward through said tubular portion and boss, a recessed nut on the outer end of said stem, and an elastic washer within the nut engaging the end of the boss, a collar on said stem engaging a seat in the bonnet, a spring in the boss engaging the nut to hold said collar to its seat, lugs on said stem at a distance from its inner end and forming spiral grooves, a tubular member in the tubular guide portion in the bonnet, spirally extending arms on said tubular member adapted to engage said grooves, and a yoke on the tubular member connecting said member and said valve disk and having lugs engaging the slots in said tubular guide portion and adapted to be engaged by the lower end of said stem when the disk is fully raised.

In testimony whereof I affix my signature in presence of two witnesses.

JOSEPH P. LAVIGNE.

Witnesses:
C. R. STICKNEY,
OTTO F. BARTHEL.